United States Patent
Kim et al.

(10) Patent No.: US 9,699,204 B2
(45) Date of Patent: Jul. 4, 2017

(54) ABNORMAL TRAFFIC DETECTION APPARATUS AND METHOD BASED ON MODBUS COMMUNICATION PATTERN LEARNING

(71) Applicant: Electronics and Telecommunications Research Institute, Daejeon (KR)

(72) Inventors: Byoung Koo Kim, Daejeon (KR); Dong Ho Kang, Daejeon (KR); Jung Chan Na, Daejeon (KR); Seon Gyoung Sohn, Daejeon (KR); Young Jun Heo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 99 days.

(21) Appl. No.: 14/699,449

(22) Filed: Apr. 29, 2015

(65) Prior Publication Data
US 2015/0381642 A1 Dec. 31, 2015

(30) Foreign Application Priority Data

Jun. 30, 2014 (KR) .......................... 10-2014-0080790

(51) Int. Cl.
*H04L 29/06* (2006.01)
*H04L 12/40* (2006.01)
(Continued)

(52) U.S. Cl.
CPC .......... *H04L 63/1425* (2013.01); *H04L 12/40* (2013.01); *H04L 41/142* (2013.01);
(Continued)

(58) Field of Classification Search
CPC ..... H04L 63/1425; H04L 12/40; H04L 41/00; H04L 69/16; H04L 69/329; H04L 41/142; H04L 43/026
See application file for complete search history.

(56) References Cited

U.S. PATENT DOCUMENTS

| | | | | |
|---|---|---|---|---|
| 6,088,804 A | * | 7/2000 | Hill | .................. G06F 21/552 |
| | | | | 726/25 |
| 6,957,348 B1 | * | 10/2005 | Flowers | ............... G06F 21/552 |
| | | | | 370/229 |

(Continued)

FOREIGN PATENT DOCUMENTS

| | | |
|---|---|---|
| KR | 10-2010-0078323 A | 7/2010 |
| KR | 10-1144819 B1 | 5/2012 |

OTHER PUBLICATIONS

Koh, P. et al., "Intrusion Detection Methodology for SCADA system environment based on traffic self-similarity property," Journal of Korea Information Processing Society, vol. 22 No. 2, 2012, pp. 267-281.

*Primary Examiner* — Kambiz Zand
*Assistant Examiner* — Tongoc Tran
(74) *Attorney, Agent, or Firm* — Nelson Mullins Riley & Scarborough LLP; Anthony A. Laurentano

(57) ABSTRACT

An abnormal traffic detection apparatus and method based on Modbus communication pattern learning is provided. The abnormal traffic detection apparatus based on the Modbus communication pattern learning previously detects and responds to abnormal traffic on a Modbus/TCP protocol. According to the present invention, a communication service between control systems can be stably provided by previously detecting the abnormal traffic capable of interfering with a stable operation of the control system. Particularly, since the effective abnormal traffic on the Modbus/TCP protocol can be previously detected, security of the control system can be increased by rapid detection and response with respect to security threats on the Intranet of the control system, and availability can be secured.

16 Claims, 8 Drawing Sheets

(51) Int. Cl.
*H04L 12/24* (2006.01)
*H04L 12/26* (2006.01)
*H04L 29/08* (2006.01)

(52) U.S. Cl.
CPC ............ *H04L 43/026* (2013.01); *H04L 69/16* (2013.01); *H04L 69/329* (2013.01); *H04L 67/12* (2013.01); *H04L 2012/40228* (2013.01)

(56) References Cited

U.S. PATENT DOCUMENTS

| | | | |
|---|---|---|---|
| 7,013,395 B1* | 3/2006 | Swiler | H04L 63/1433 713/151 |
| 7,536,548 B1* | 5/2009 | Batke | H04L 63/061 713/166 |
| 7,990,967 B2* | 8/2011 | Brandt | H04L 63/02 370/392 |
| 2002/0016858 A1* | 2/2002 | Sawada | H04L 29/12018 709/238 |
| 2002/0120728 A1* | 8/2002 | Braatz | H04L 29/06 709/223 |
| 2002/0152289 A1* | 10/2002 | Dube | G05B 19/05 709/220 |
| 2002/0199122 A1* | 12/2002 | Davis | G06F 21/577 726/25 |
| 2003/0126472 A1* | 7/2003 | Banzhof | G06F 21/577 726/25 |
| 2004/0073800 A1* | 4/2004 | Shah | H04L 63/1433 713/176 |
| 2004/0117624 A1* | 6/2004 | Brandt | H04L 63/1408 713/166 |
| 2004/0143753 A1* | 7/2004 | Hernacki | H04L 63/14 726/25 |
| 2006/0053491 A1* | 3/2006 | Khuti | H04L 63/02 726/23 |
| 2008/0178010 A1* | 7/2008 | Vaterlaus | H04L 63/0485 713/189 |
| 2011/0016523 A1 | 1/2011 | Oh et al. | |
| 2011/0138463 A1 | 6/2011 | Kim et al. | |
| 2015/0156286 A1* | 6/2015 | Blair | H04L 12/4625 709/201 |

* cited by examiner

FIG.2B

| Modbus PDU | | | | FUNCTION CODE | | | |
|---|---|---|---|---|---|---|---|
| | | | | CODE | SUB CODE | (HEX) | PAGE |
| DATA ACCESS | BIT ACCESS | PHYSICAL DISCRETE INPUTS | READ DISCRETE INPUTS | 02 | | 02 | 13 |
| | | INTERNAL BITS OR PHYSICAL COILS | READ COILS | 01 | | 01 | 11 |
| | | | WRITE SINGLE COIL | 05 | | 05 | 18 |
| | | | WRITE MULTIPLE COILS | 15 | | 0F | 30 |
| | 16 BITS ACCESS | PHYSICAL INPUT REGISTERS | READ INPUT REGISTER | 04 | | 04 | 16 |
| | | INTERNAL REGISTERS OR PHYSICAL OUTPUT REGISTERS | READ HOLDING REGISTERS | 03 | | 03 | 15 |
| | | | WRITE SINGLE REGISTER | 06 | | 06 | 19 |
| | | | WRITE MULTIPLE REGISTERS | 16 | | 10 | 32 |
| | | | READ/WRITE MULTIPLE REGISTERS | 23 | | 17 | 40 |
| | | | MASK WRITE REGISTER | 22 | | 16 | 39 |
| | | | READ FIFO QUEUE | 24 | | 18 | 43 |
| | FILE RECORD ACCESS | | READ FILE RECORD | 20 | 6 | 14 | 42 |
| | | | WRITE FILE RECORD | 21 | 6 | 15 | 44 |
| | DIAGNOSTICS | | READ EXCEPTION STATUS | 07 | | 07 | 20 |
| | | | DIAGNOSTIC | 08 | 00-18 | | 21 |
| | | | GET COM EVENT COUNTER | 11 | | 0B | 26 |
| | | | GET COM EVENT LOG | 12 | | 0C | 28 |
| | | | REPORT SLAVE ID | 17 | | 11 | 34 |
| | | | READ DEVICE IDENTIFICATION | 43 | 14 | 2B | 46 |
| | OTHER | | ENCAPSULATED INTERFACE TRANSPORT | 43 | | 2B | 44 |

ABNORMAL TRAFFIC DETECTION APPARATUS AND METHOD BASED ON MODBUS COMMUNICATION PATTERN LEARNING

CROSS-REFERENCE TO RELATED APPLICATION

This application claims priority to and the benefit of Korean Patent Application No. 10-2014-0080790, filed on Jun. 30, 2014, the disclosure of which is incorporated herein by reference in its entirety.

BACKGROUND

1. Field of the Invention

The present invention relates to an abnormal traffic detection apparatus and method based on Modbus communication pattern learning, and more particularly, to an apparatus and method for previously detecting and responding to abnormal traffic.

2. Discussion of Related Art

Generally, a control system is a system of effectively monitoring and managing remote resources, and is being used for an operation of national key infrastructure such as power, gas, water and sewage, public transportation, etc.

Protocol standards with respect to the control system are being gradually converted from private to public (to international standard), and this conversion may cause a result in which more knowledge with respect to the control system and a network operation is provided to an attacker.

As a result, a risk of cyber infringement on the control system is continuously being increased, and when the cyber infringement on the control system is generated, since national chaos may be caused, a specific security management for the control system is required.

A Modbus protocol among communication protocols used in the control system is an industrial communication protocol developed by Modicon in 1979 for power line communication (PLC) control.

The Modbus protocol is an application layer message protocol of providing client/server based request/reply communication using various communication media, and is one of the most widely used communication protocols in the world.

Communication methods of the Modbus protocol are classified into a Modbus serial method, a Modbus plus method, and a Modbus/transmission control protocol (TCP) method, etc., and the Modbus plus method had been largely used for communication between host systems before the Modbus/TCP method was developed.

However, after the Modbus/TCP method was developed, the Modbus/TCP method holding a dominant position in terms of a communication speed and an operation of the system has been largely used, and the Modbus plus method and the Modbus serial method previously used have been used in a manner of being converted into the Modbus/TCP through a gateway and being connected to the host system.

The Modbus protocol is being used as a general protocol standard of the control system, but there is a problem in which an attack using the Modbus protocol is easy.

That is, recently, because of attacking a weak point of the Modbus protocol instead of attacking the control system using a malicious code such as Stuxnet, etc. when the control system uses the Modbus as a protocol standard, an attack risk is increased more.

For example, when using a Dismal attack tool which is first published in the Power of Community (POC) 2011, information regarding the control system used according to facilities such as hydroelectric power plants or nuclear power plants, etc. may be collected.

That is, when an information collection command is input to the Dismal attack tool, since the information is transmitted to the attacker regardless of a kind of the control system, a new type of attack may be generated through easy packet manipulation by the attacker, and a malicious command may be transmitted. Accordingly, there is a problem in which the control system is weaker on a protocol attack capable of attacking only by the packet manipulation than a zero-day attack such as Stuxnet.

Accordingly, in order to complement the weak point, a prior patent (Korean Patent Publication No. 10-2010-0078323), etc. discloses technology capable of implementing stable and reliable communication by preventing information leakage due to hacking generated by invasion from the outside and protecting information related to control and measurement data, etc. on a Modbus-based supervisory control and data acquisition (SCADA) network.

However, the prior patent has to encode or encrypt monitoring and control data transmitted from a host system such as a SCADA server through a security device before transmitting through the SCADA network, and has to decode the encoded data through a security device of a subsystem such as a remote terminal before the remote terminal receives the encoded data received through the SCADA network.

That is, the prior patent has problems in which a complex operation such as the decoding or encoding has to be performed whenever the SCADA server and the remote terminal transmit and receive data (information related to the control and measurement data, etc.) and it is difficult to respond to an internal attack which will be described later.

Meanwhile, since the Modbus protocol does not consider security items such as authentication, authorization, etc. with respect to a response of the server corresponding to a request of a client, security items in terms of service denial attacks besides the security weak point on the control protocol are required.

For example, loads of some devices may be caused by general network traffic such as broadcast/multicast, or some devices may be crashed.

As a result, concerns about activities of interfering with a safe operation of a control system of critical infrastructure are being increased due to intentional or unintentional behaviors, but currently, since enterprise security products such as firewalls, an intrusion detection system (IDS), an intrusion prevention system (IPS), etc. are concentrated in a border area of an external network, the enterprise security products are weak to problems that occur in an internal infrastructure.

That is, in a situation that intrusion paths including insider threats become diverse, since it is focused on security of a border network even in a control network, a measure of internal behavior analysis is weak.

Accordingly, in order to provide a safe service between the control systems, security on the protocol used in the control system is required.

SUMMARY OF THE INVENTION

The present invention is directed to an abnormal traffic detection apparatus and method based on Modbus communication pattern learning which can previously detect and respond to abnormal traffic on a Modbus/TCP protocol.

The present invention is also directed to an abnormal traffic detection apparatus and method based on Modbus communication pattern learning which can prevent an attack on a control system of critical infrastructure due to intentional/unintentional behaviors by previously detecting abnormal traffic.

According to one aspect of the present invention, there is provided an abnormal traffic detection apparatus, including: a communication pattern classifier configured to monitor traffic generated in Modbus/TCP communication of a control system monitoring a remote resource during a predetermined period, and generate a Modbus communication pattern based on the monitored traffic; and an abnormal behavior detector configured to detect abnormal traffic of the control system based on the generated Modbus communication pattern.

According to another aspect of the present invention, there is provided an abnormal traffic detection method, including: monitoring traffic generated in Modbus/TCP communication of a control system monitoring a remote resource during a predetermined period, and generating a Modbus communication pattern based on the monitored traffic; and detecting abnormal traffic of the control system based on the generated Modbus communication pattern.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 2A and 2B are diagrams illustrating an application data unit (ADU) of a Modbus/TCP protocol according to an embodiment of the present invention;

DETAILED DESCRIPTION OF EXEMPLARY EMBODIMENTS

Hereinafter, exemplary embodiments of the present invention will be described in detail below with reference to the accompanying drawings. However, the present invention is not limited to exemplary embodiments which will be described hereinafter, and can be implemented by various different types. Exemplary embodiments of the present invention are described below in sufficient detail to enable those of ordinary skill in the art to embody and practice the present invention. The present invention is defined by claims. Meanwhile, the terminology used herein to describe exemplary embodiments of the invention is not intended to limit the scope of the invention. The articles "a," "an," and "the" are singular in that they have a single referent, but the use of the singular form in the present document should not preclude the presence of more than one referent. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

The present invention may be technology of learning a transmission and reception data pattern in Modbus/TCP communication of a control system monitoring remote resources, and detecting abnormal traffic through the learned transmission and reception data pattern, and for this, the present invention may be arranged between a client and a server included in the control system and monitor a packet during a predetermined period.

The present invention may learn all traffic between the client and the server, effectively detect various types of the abnormal traffic using all learned traffic, and respond to the detected abnormal traffic by monitoring the packet during the predetermined period on an Intranet of the control system.

Figure 1:
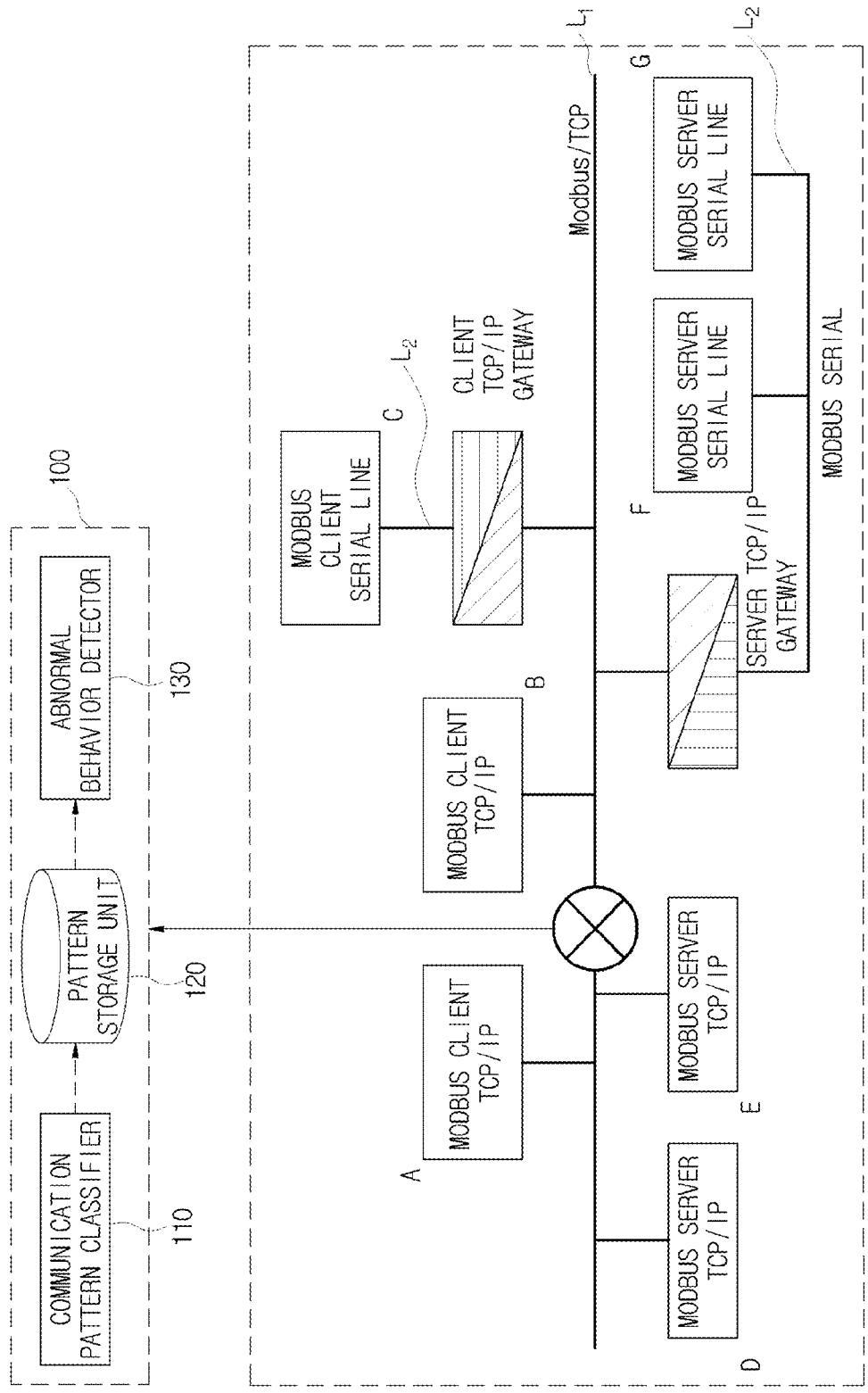
FIG. 1 is a diagram illustrating an abnormal traffic detection apparatus based on Modbus communication pattern learning according to an embodiment of the present invention.
Figure 2A:
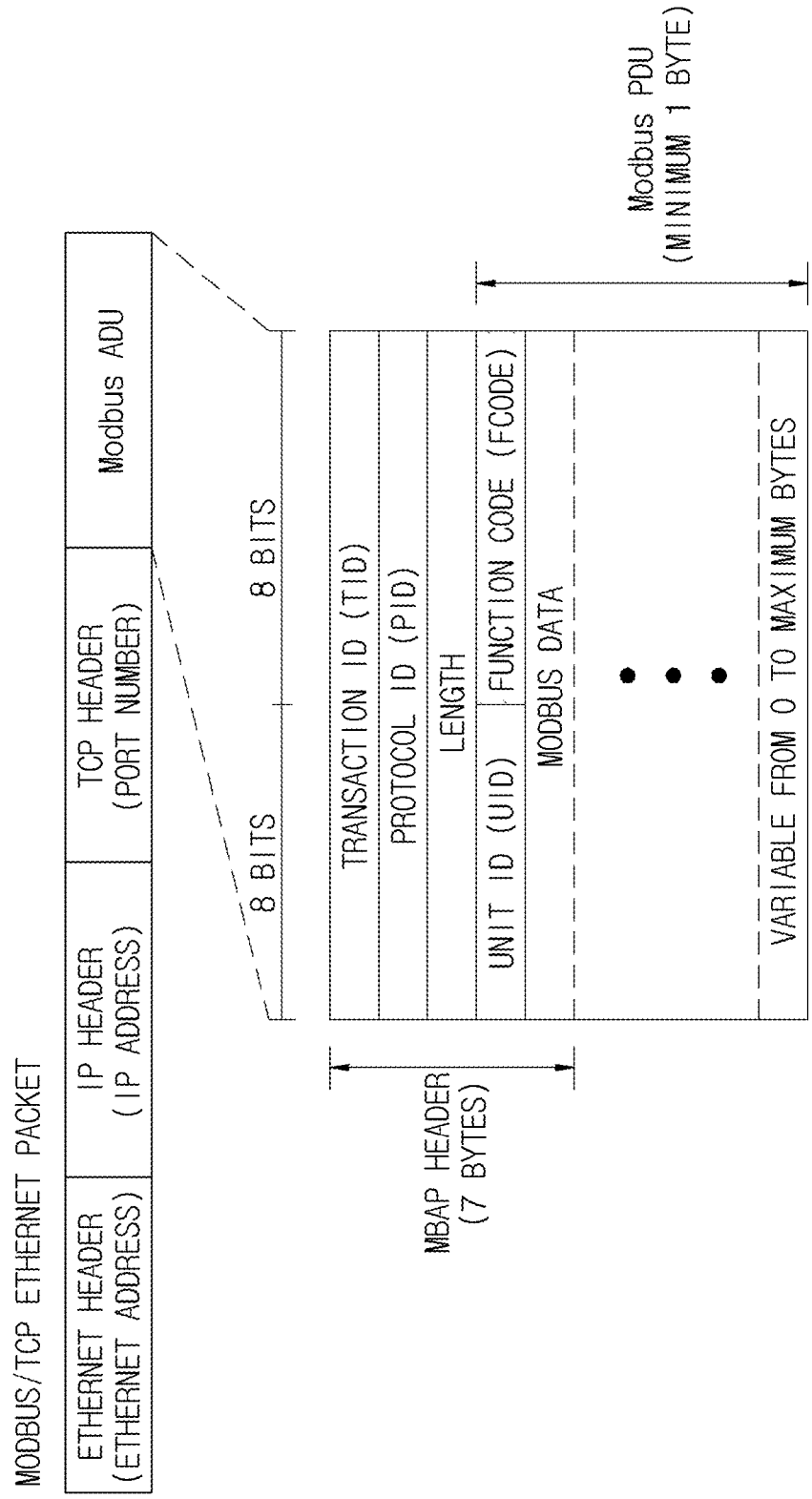
Figure 3:
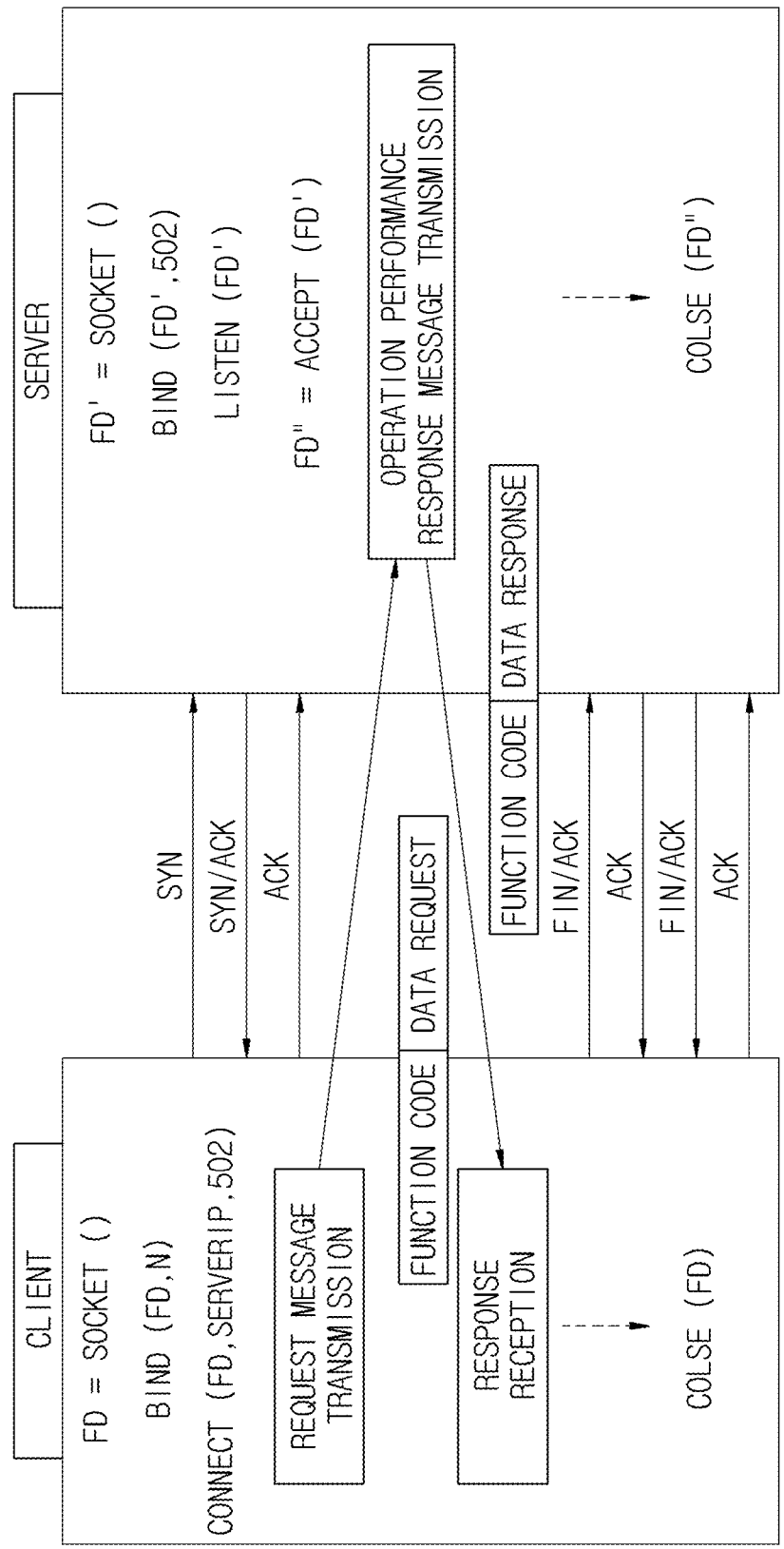
FIG. 3 is a diagram illustrating a procedure in which a server and a client communicate using an ADU of a Modbus/TCP protocol according to an embodiment of the present invention.
Figure 4:
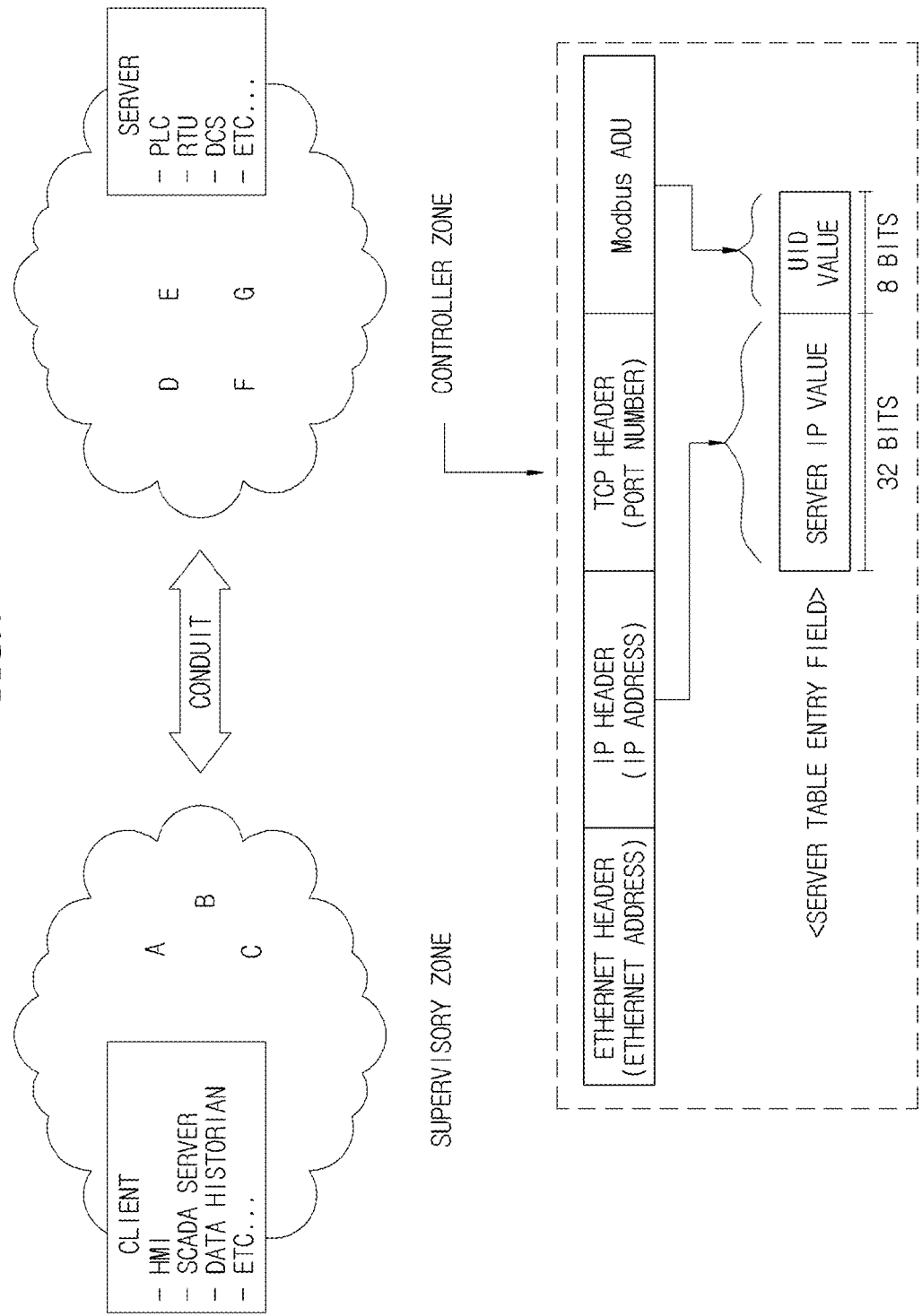
FIGS. 4 and 5 are diagrams illustrating a method of generating a Modbus communication pattern based on a Modbus protocol communication method according to an embodiment of the present invention.
Figure 5:
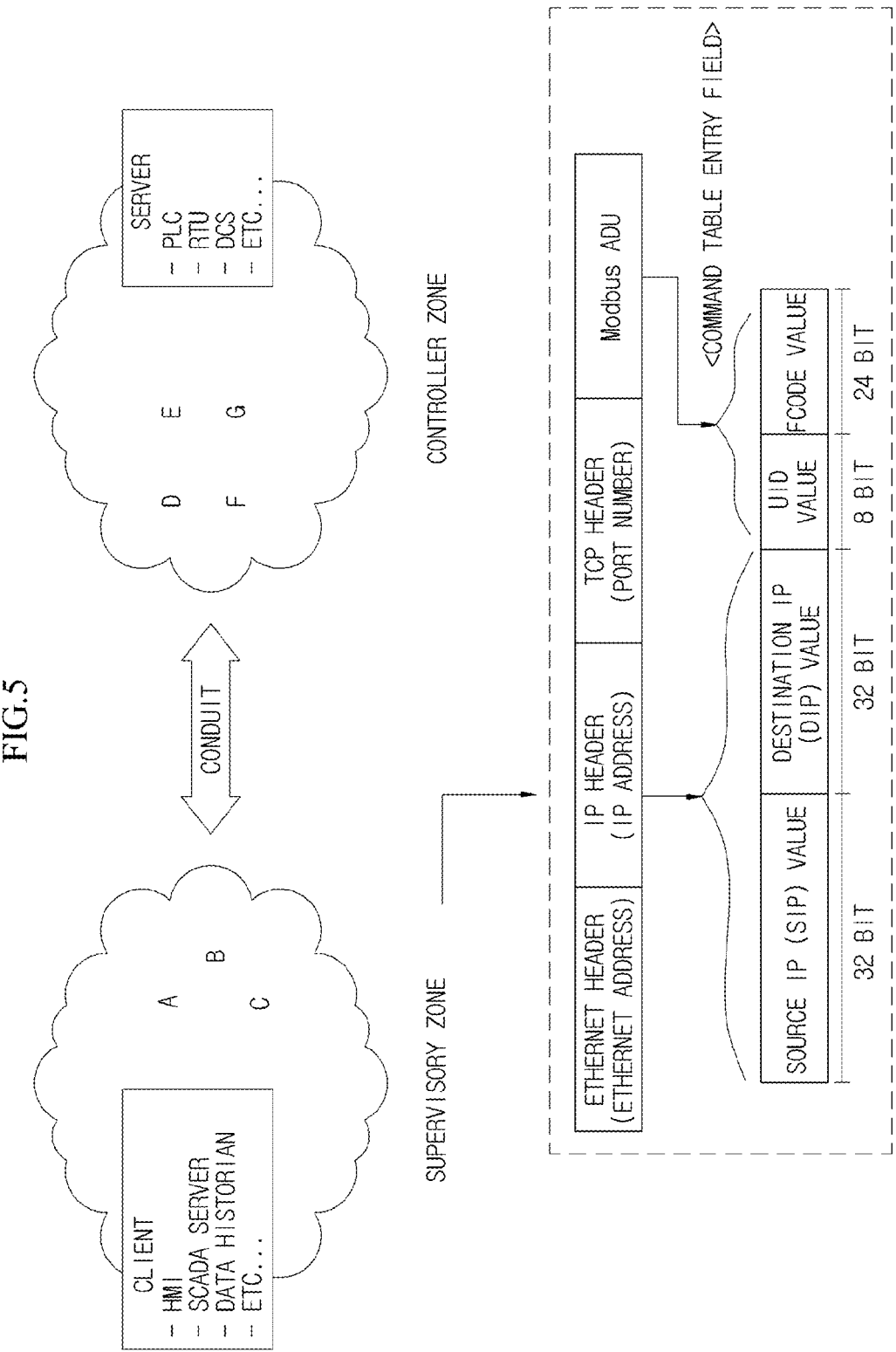
Figure 6:
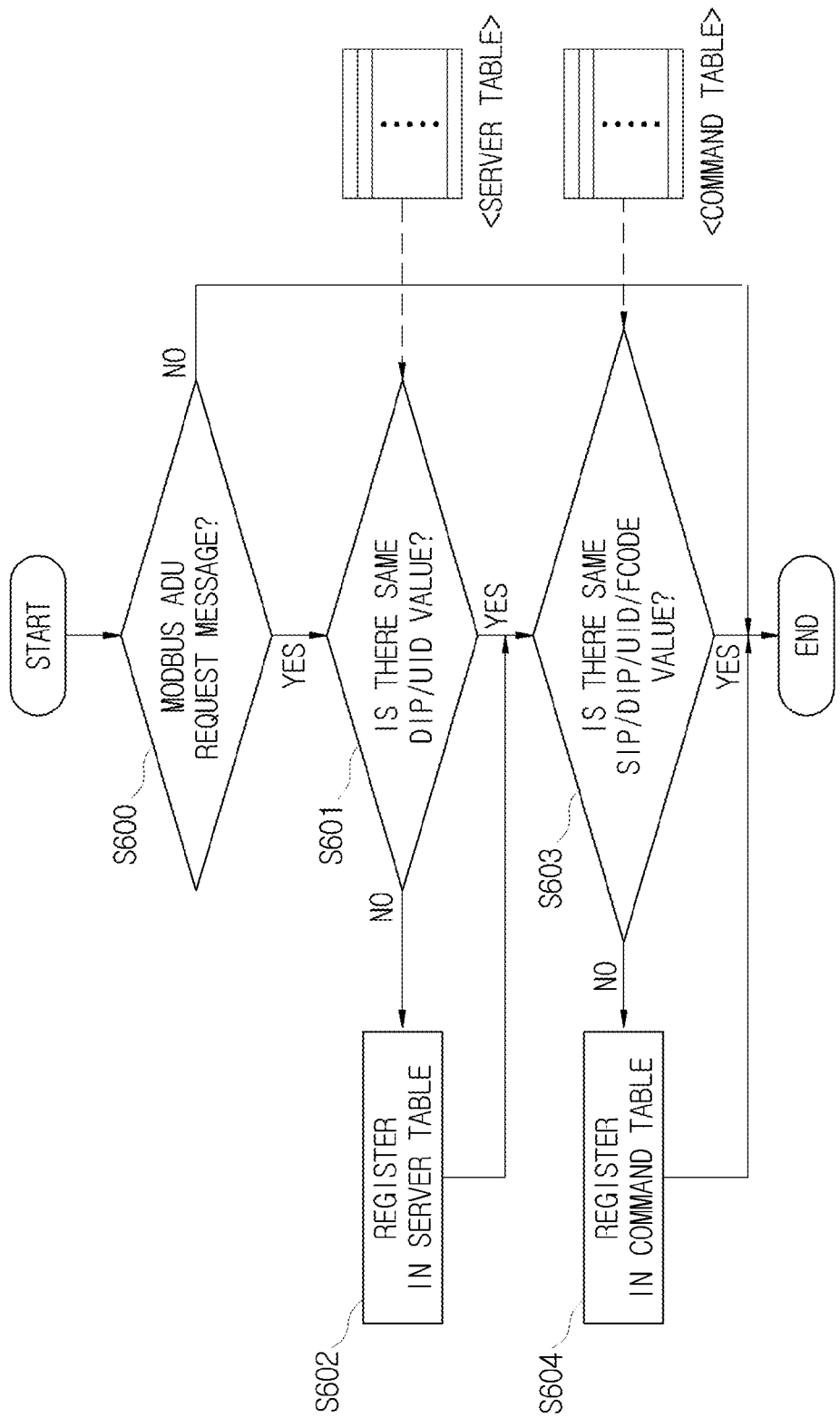
FIG. 6 is a flowchart for describing a method of generating a Modbus communication pattern according to an embodiment of the present invention.
Figure 7:
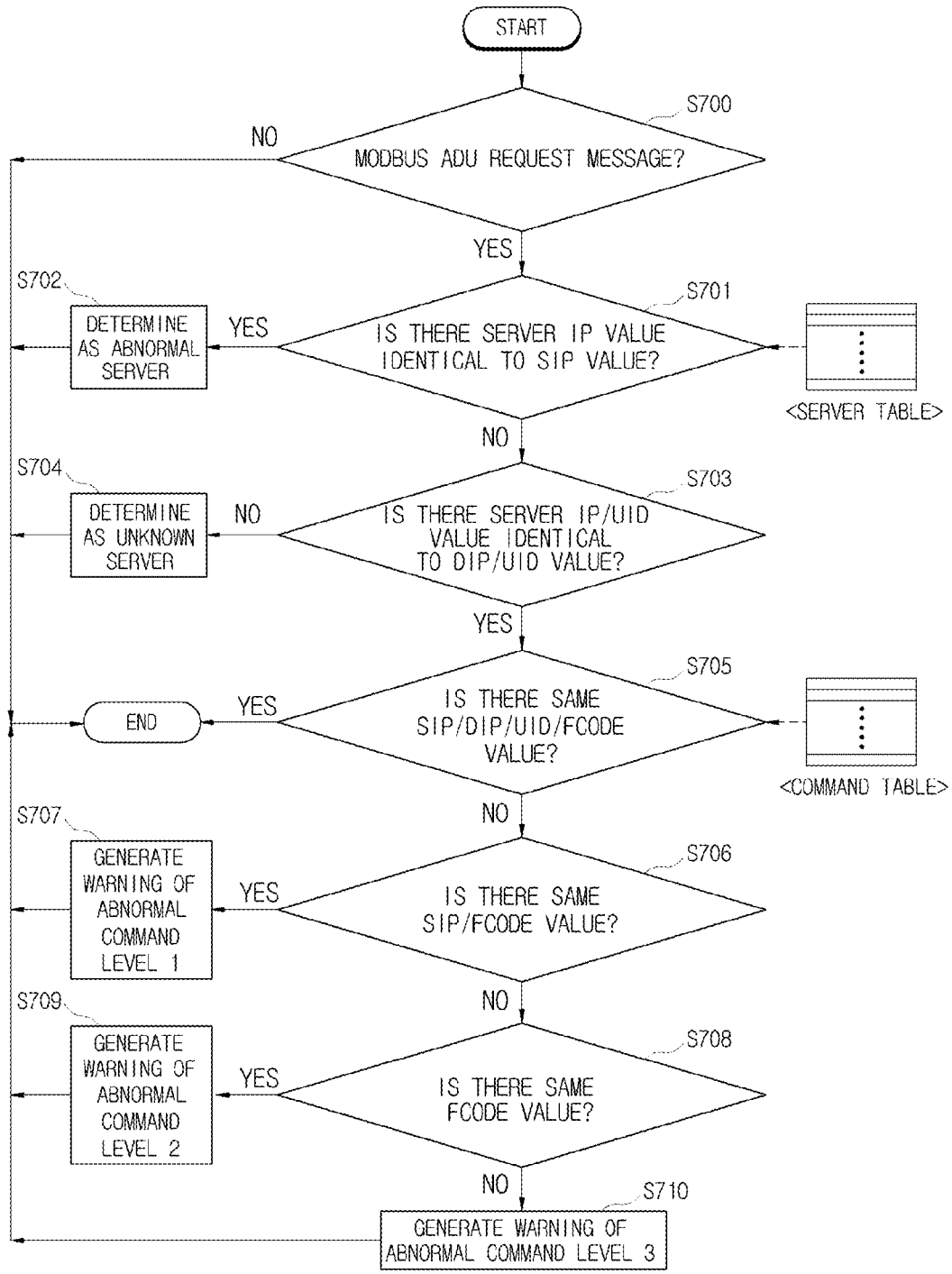
FIG. 7 is a flowchart for describing an abnormal traffic detection method based on Modbus communication pattern learning according to an embodiment of the present invention.

Hereinafter, an abnormal traffic detection apparatus and method based on Modbus communication pattern learning according to an embodiment of the present invention will be described with reference to FIGS. 1 to 7. FIG. 1 is a diagram illustrating an abnormal traffic detection apparatus based on Modbus communication pattern learning according to an embodiment of the present invention, FIGS. 2A and 2B are diagrams illustrating an application data unit (ADU) of a Modbus/TCP protocol according to an embodiment of the present invention, FIG. 3 is a diagram illustrating a procedure in which a server and a client communicate using an ADU of a Modbus/TCP protocol according to an embodiment of the present invention, FIGS. 4 and 5 are diagrams illustrating a procedure of generating a Modbus communication pattern based on a Modbus protocol communication method according to an embodiment of the present invention, FIG. 6 is a flowchart for describing a method of generating a Modbus communication pattern according to an embodiment of the present invention, and FIG. 7 is a flowchart for describing an abnormal traffic detection method based on Modbus communication pattern learning according to an embodiment of the present invention.

As shown in FIG. 1, an abnormal traffic detection apparatus 100 based on Modbus communication pattern learning according to an embodiment of the present invention may include a communication pattern classifier 110, a pattern storage unit 120, and an abnormal behavior detector 130.

The abnormal traffic detection apparatus 100 may be arranged in a location capable of monitoring all traffic of a control system monitoring remote resources, or in a location capable of monitoring a packet using a mirroring port, etc.

For example, the abnormal traffic detection apparatus 100 may be arranged in a location capable of monitoring a Modbus/TCP packet in Modbus TCP communication of the control system on a Modbus/TCP line $L_1$.

The communication pattern classifier 110 may generate a Modbus communication pattern based on the monitored traffic, and store the generated Modbus communication pattern in the pattern storage unit 120.

For example, the communication pattern classifier 110 may monitor the traffic according to the Modbus/TCP communication of the control system during a predetermined period, and generate the Modbus communication pattern based on the monitored traffic.

It may be desired that this operation performs during a time capable of collecting every normal communication pattern, and the time for each system may be obtained by previously and empirically estimating.

The abnormal behavior detector 130 may determine whether the Modbus traffic is abnormal based on a pattern stored in the pattern storage unit 120.

For example, the abnormal behavior detector 130 may detect the abnormal traffic in the Modbus/TCP communication of the control system based on the Modbus communication pattern generated by the communication pattern classifier 110.

Meanwhile, a Modbus serial line $L_2$ may be connected to the Modbus/TCP line $L_1$ by a server TCP/Internet protocol (IP) gateway, a client TCP/IP gateway, etc.

That is, one end of each of the server TCP/IP gateway and the client TCP/IP gateway, etc. may be connected to the Modbus/TCP line $L_1$, the other end of each of the server TCP/IP gateway and the client TCP/IP gateway, etc. may be connected to the Modbus serial line $L_2$, and each of the server TCP/IP gateway and the client TCP/IP gateway, etc. may convert the Modbus serial communication into the Modbus/TCP communication, or convert the Modbus/TCP communication into the Modbus serial communication.

The abnormal traffic detection apparatus 100 according to an embodiment of the present invention described above may be arranged between the client and the server included in the control system in order to monitor the packet on the Intranet of the control system, and the server and the client may communicate using an application data unit (ADU) of a Modbus/TCP protocol.

As shown in FIG. 2A, the Modbus ADU may be located after a TCP header, and include a Modbus application protocol (MBAP) header having a size of 7 bytes and a Modbus protocol data unit (PDU) having a variable size.

The MBAP header may include a transaction identification (TID), a protocol ID (PID), a length, and a unit ID (UID).

The TID may be an identifier on a pair of Modbus transmission and reception messages.

When the Modbus protocol is used, the PID may be set as 0.

The length may be a length from the UID to last data, and use the unit of bytes.

The UID may be an identifier on a remote server or a remote client connected to another bus such as the serial line, and be set as 00 or FF when the remote server or the remote client is not connected to (not present on) the serial line.

The Modbus PDU may include a function code FCode having a size of at least one byte, and the client may request operations desired to be performed by the function code FCode to the server.

A detailed structure of the Modbus PDU is shown in FIG. 2B.

Meanwhile, as shown in FIG. 3, the client may try to connect to a port 502 of the server, the server may accept the trial of the client, and be connected to the client through the port 502. That is, a TCP session between the client and the server may be connected.

When the TCP session is connected, the client may transmit a request message to the server.

The server may perform an operation according to the received request message, and transmit a response message according to the operation to the client.

That is, the client may allow the server to perform a specific operation using the function code FCode and the request message, etc. The server may process and respond to the request received from the client.

Accordingly, the communication pattern classifier 110 may generate the Modbus communication pattern based on the Modbus protocol communication method described above.

In order to generate the Modbus communication pattern, the communication pattern classifier 110 may classify the control system performing the Modbus/TCP communication using port information of a Modbus/TCP communication packet into a client and a server.

For example, when a value of a source port Sport of the monitored packet is 502, the communication pattern classifier 110 may classify a device corresponding to a value of a source IP (SIP) as the server.

Further, when a value of a destination port Dport is 502, the communication pattern classifier 110 may classify a device corresponding to a destination IP (DIP) as the server.

That is, since the server has a constant port value and the client automatically has an unused value among values of 0 to 65535, the communication pattern classifier 110 may classify the device in which the port value is 502 as the server, and as shown in FIG. 4, classify devices as the server and the client.

The communication pattern classifier 110 may classify the control system into a supervisory zone in which clients A, B, and C are included and a controller zone in which servers D, E, F, and G are included based on the classified result.

Accordingly, the communication pattern classifier 110 may generate an entry of a server table including values of server IPs and UIDs with respect to the servers D, E, F, and G having IPs IP_D, IP_E, IP_F, and IP_G.

Further, the communication pattern classifier 110 may collect a Modbus command packet (a Modbus request message) generated by the clients A, B, and C as shown in FIG. 5.

The communication pattern classifier 110 may generate an entry of a command table based on the collected command packet.

That is, the communication pattern classifier 110 may extract values of the client IP, the server IP, the UID, and the function code FCode from the Modbus command packet in which the value of the destination port is 502.

The communication pattern classifier 110 may generate the entry of the command table based on the extracted values.

Hereinafter, a method of generating a Modbus communication pattern (a method of generating an entry of a server table and an entry of a command table) according to an embodiment of the present invention will be described in more detail with reference to FIG. 6.

As shown in FIG. 6, the communication pattern classifier 110 may monitor a received packet during a predetermined period, and determine whether the received packet is a Modbus request message based on the monitored result (S600).

When the received packet is the Modbus request message based on the determination result, that is, when the value of the destination port of the received packet is 502 and a value of the PID of the Modbus ADU is 0, the communication pattern classifier 110 may determine whether a value of a server IP identical to the value of the DIP/UID of the received packet is registered in the server table (S601).

As described above, when a DIP/UID which is the value of the DIP combined with the value of the UID is used, since even the server present on the serial line (another bus) can be identified, the communication pattern classifier 110 may use the value of the DIP/UID without simply using only the value of the DIP in order to determine exactly whether the server corresponding to the value of the DIP is a server registered in the server table.

When the value of the server IP identical to the DIP/UID of the received packet is not registered in the server table based on the determination result of the operation S601, the communication pattern classifier 110 may register the DIP/UID of the received packet in the server table (S602).

However, when the value of the server IP identical to the DIP/UID of the received packet is registered in the server table based on the determination result of the operation S601, the communication pattern classifier 110 may determine whether information identical to information in which values of the SIP, the DIP, the UID, and the FCode of the received packet are combined is registered in the command table (S603).

When the information identical to the combined SIP/DIP/UID/FCode information of the received packet is not registered in the command table based on the determination result, the communication pattern classifier 110 may register the combined SIP/DIP/UID/FCode information in the command table (S604).

As described above, the communication pattern classifier 110 may generate and learn the Modbus communication pattern before the abnormal behavior detector 130 is operated.

Accordingly, the present invention can reduce an operation load since the entries of the server table and the command table (the Modbus communication pattern) can be generated using only the Modbus request message, that is, only the Modbus request message is analyzed when monitoring the packet.

Hereinbefore, the method of generating the Modbus communication pattern according to an embodiment of the present invention has been described with reference to FIG. 6, and hereinafter, an abnormal traffic detection method based on Modbus communication pattern learning according to an embodiment of the present invention will be described with reference to FIG. 7.

The abnormal behavior detector 130 may detect abnormal traffic based on a Modbus communication pattern learned by the communication pattern classifier 110 using only a Modbus request message.

Accordingly, as shown in FIG. 7, the abnormal behavior detector 130 may determine whether the received packet is the Modbus request message (S700).

When the received packet is the Modbus request message based on the determination result, that is, when the value of the destination port is 502 and the value of the PID of the Modbus ADU is 0, it may be determined whether there is a value of the server IP identical to a value of the SIP of the received packet in the server table (S701).

When there is the value of the server IP identical to the value the SIP of the received packet in the server table based on the determination result, the abnormal behavior detector 130 may determine that the server corresponding to the SIP of the received packet is an abnormal server (invalid SIP behavior detection) (S702).

That is, when there is the value of the server IP identical to the value of the SIP of the received packet in the server table, since the Modbus request message is generated by not the client but the server, the abnormal behavior detector 130 may determine that the server corresponding to the value of the SIP is attacked by an attacker, or is abnormal, etc.

However, when there is not the value of the server IP identical to the value of the SIP of the received packet in the server table based on the determination result of the operation S701, the abnormal behavior detector 130 may determine whether there is a value of the server IP ServerIP/UID (the server IP combined with the UID) identical to the value of the DIP/UID of the received packet in the server table (S703).

When there is not the value of ServerIP/UID identical to the value of the DIP/UID of the received packet in the server table, since the value of the DIP/UID of the received packet is not the value of the server IP registered while learning, the abnormal behavior detector 130 may determine that the server corresponding to the value of the DIP/UID of the received packet is an unknown server (unknown server detection) (S704).

That is, the abnormal behavior detector 130 may determine that the client corresponding to the received packet is attacked by the attacker, or a new server is newly included in the control system by an administrator, etc. when there is not the ServerIP/UID identical to the DIP/UID of the received packet in the server table.

However, when there is the value of the ServerIP/UID identical to the value of the DIP/UID of the received packet in the server table based on the determination result of the operation S703, the abnormal behavior detector 130 may determine whether there is information identical to the combined SIP/DIP/UID/FCode information of the received packet in the command table (S705).

At this time, since the value of the UID of the Modbus ADU included in the received packet is information combined with the value of the DIP, the abnormal behavior detector 130 may not need to determine separately whether there is the value of the UID of the Modbus ADU included in the received packet in the server table, and may determine that every device present on the serial line sharing the value of a corresponding server IP, that is, the value of the DIP/UID is the server.

Meanwhile, when there is not the information identical to the combined SIP/DIP/UID/FCode information of the received packet in the command table based on the determination result of the operation S705, the abnormal behavior detector 130 may determine whether there is information identical to information in which the values of the SIP and the FCode are combined in the command table (S706).

When there is the information identical to the combined SIP/FCode information in the command table, the abnormal behavior detector 130 may generate a warning of an abnormal command level 1 (warning command level 1) which is a minimum risk level (S707).

However, when there is not the information identical to the combined SIP/FCode information in the command table based on the determination result of the operation S706, the abnormal behavior detector 130 may determine whether there is only the FCode in the command table (S708).

When there is only the FCode in the command table based on the determination result of the operation S708, the abnormal behavior detector 130 may generate a warning of an abnormal command level 2 (a warning command level 2) (S709).

However, when there is not even the FCode in the command table based on the determination result of the operation S708, that is, when there is not the information identical to the combined SIP/FCode information and there is not the FCode itself in the command table, the abnormal behavior detector 130 may generate a warning of an abnormal command level 3 (a warning command level 3) which is the maximum risk level (S710).

Meanwhile, as described above, the present invention may classify warning levels by checking available command and server of a corresponding client from the viewpoint of the client, and can perform a systematic response with respect to the abnormal traffic through the classification.

Further, when there are changes on the Internet of the control system by the administrator, the present invention can newly generate a Modbus communication pattern (entries of the server table and the command table) through a new learning time, and exactly detect the abnormal traffic through the newly generated Modbus communication pattern.

That is, the present invention can generate the Modbus communication pattern, and effectively and rapidly detect the abnormal traffic on the Modbus protocol of the control system based on the learning with respect to the generated Modbus communication pattern.

Moreover, the present invention can respond to the abnormal traffic, and provide a stable and reliable service between the server and the client of the control system.

Furthermore, the present invention can effectively detect various types of the abnormal traffic capable of being generated in the Modbus/TCP communication through minimum table management and packet analysis.

According to the present invention, various types of the abnormal traffic based on the Modbus communication pattern learning can be detected.

That is, a communication service between the control systems can be stably provided by previously detecting the abnormal traffic capable of interfering with a stable operation of the control system.

Particularly, since the effective abnormal traffic on the Modbus/TCP protocol can be previously detected, security of the control system can be increased by rapid detection and response with respect to security threats on the Intranet of the control system and availability can be secured.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An abnormal traffic detection apparatus, comprising:
a communication pattern classifier configured to monitor traffic generated in Modbus/TCP communication of a control system monitoring a remote resource during a predetermined period, and generate a Modbus communication pattern based on the monitored traffic; and
an abnormal behavior detector configured to detect abnormal traffic of the control system based on the generated Modbus communication pattern,
wherein the abnormal behavior detector detects the abnormal traffic in the Modbus/TCP communication of the control system based on a Modbus request message received from a client of the control system and the generated Modbus communication pattern, and determines whether there is a value of a server IP identical to a value of a source IP (SIP) of the Modbus request message in a server table included in the Modbus communication pattern, and when there is the value of the server IP identical to the value of the SIP in the server table based on the determination result, determines that a server corresponding to the SIP is an abnormal server.

2. The abnormal traffic detection apparatus of claim 1, wherein the communication pattern classifier collects a Modbus request message generated by a client of the control system, and generates the Modbus communication pattern based on the Modbus request message.

3. The abnormal traffic detection apparatus of claim 2, wherein the communication pattern classifier determines whether a value of a server IP identical to a value of a destination IP (DIP) of the Modbus request message is registered in a server table included in the Modbus communication pattern, and when the value of the server IP identical to the value of the DIP of the Modbus request message is not registered in the server table based on the determination result, registers the value of the DIP in the server table.

4. The abnormal traffic detection apparatus of claim 2, wherein the communication pattern classifier determines whether information identical to information in which values of a source IP (SIP), a destination IP (DIP), a unit ID (UID), and a function code (FCode) of the Modbus request message are combined is registered in a command table included in the Modbus communication pattern, and when the information identical to the combined SIP/DIP/UID/FCode information is not registered in the command table based on the determination result, registers the combined SIP/DIP/UID/FCode information in the command table.

5. The abnormal traffic detection apparatus of claim 1, wherein the communication pattern classifier collects a Modbus request message generated by a client of the control system, and generates entries of a server table and a command table as the Modbus communication pattern based on the collected Modbus request message.

6. The abnormal traffic detection apparatus of claim 5, wherein the communication pattern classifier generates the entry of the server table including values of a server IP and a unit ID (UID), and the entry of the command table including a source IP (SIP), a destination IP (DIP), a unit ID (UID), and a function code (FCode).

7. The abnormal traffic detection apparatus of claim 1, wherein the abnormal behavior detector determines whether there is the value of the server IP identical to a value of a destination IP (DIP) of the Modbus request message in the server table when there is not the value of the server IP identical to the value of the SIP of the Modbus request message in the server table based on the determination result, and when there is not the value of the server IP identical to the value of the DIP in the server table based on the determination result, determines that a server corresponding to the value of the DIP is an unknown server.

8. The abnormal traffic detection apparatus of claim 7, wherein the abnormal behavior detector determines whether there is information identical to information in which values of a source IP (SIP), a destination IP (DIP), a unit ID (UID), and a function code (FCode) of the Modbus request message are combined in a command table included in the Modbus communication pattern when there is the value of the server IP identical to the value of the DIP in the server table, sets an abnormal command level according to the determination result, and generates a warning based on the set result.

9. An abnormal traffic detection method, comprising:
monitoring traffic generated in Modbus/TCP communication of a control system monitoring a remote resource during a predetermined period, and generating a Modbus communication pattern based on the monitored traffic; and
detecting abnormal traffic of the control system based on the generated Modbus communication pattern,
wherein the detecting of the abnormal traffic of the control system comprises:
detecting the abnormal traffic in Modbus/TCP communication of the control system based on a Modbus request message received from a client of the control system and the generated Modbus communication pattern, and
wherein the detecting of the abnormal traffic in the Modbus/TCP communication comprises:
determining whether there is a value of a server IP identical to a value of a source IP (SIP) of the Modbus request message in a server table included in the Modbus communication pattern; and
determining that a server corresponding to the source IP is an abnormal server when there is the value of the server IP identical to the value of the SIP in the server table based on the determination result.

10. The abnormal traffic detection method of claim 9, wherein the generating of the Modbus communication pattern comprises:
collecting a Modbus request message generated by a client of the control system; and
generating entries of a server table and a command table as the Modbus communication pattern based on the collected Modbus request message.

11. The abnormal traffic detection method of claim 10, wherein the generating of the entries comprises:
registering a value of a destination IP (DIP) in the server table when a value of a server IP identical to the value of the DIP of the Modbus request message is not registered in the server table included in the Modbus communication pattern;
determining whether there is information identical to information in which values of a source IP (SIP), a destination IP (DIP), a unit ID (UID), and a function code (FCode) of the Modbus request message are combined in the command table included in the Modbus communication pattern; and
registering the combined SIP/DIP/UID/FCode information in the command table when there is not the information identical to the combined SIP/DIP/UID/FCode information of the Modbus request message in the command table based on the determination result.

12. The abnormal traffic detection method of claim 9, wherein the detecting of the abnormal traffic in the Modbus/TCP communication further comprises:
determining whether there is the value of a server IP identical to a value of a destination IP (DIP) of the Modbus request message in the server table when there is not the value of the server IP identical to the value of the SIP in the server table based on the determination result; and
determining that a server corresponding to the DIP is an unknown server when there is not the value of the server IP identical to the value of the DIP in the server table based on the determination result.

13. The abnormal traffic detection method of claim 12, wherein the detecting of the abnormal traffic in the Modbus/TCP communication further comprises:
determining whether there is information identical to information in which values of a source IP (SIP), a destination IP (DIP), a unit ID (UID), and a function code (FCode) of the Modbus request message are combined in a command table included in the Modbus communication pattern when there is the value of the server IP identical to the value of the DIP in the server table; and
setting an abnormal command level based on the determination result, and generating a warning based on the set result.

14. The abnormal traffic detection method of claim 13, wherein the generating of the warning comprises:
determining whether there is information identical to information in which the values of the SIP and the FCode are combined in the command table when there is not the information identical to the combined SIP/DIP/UID/FCode information in the command table; and
setting the abnormal command level as the minimum risk level when there is the information identical to the combined SIP/FCode information in the command table based on the determination result.

15. The abnormal traffic detection method of claim 14, wherein the generating of the warning further comprises:
determining whether there is a function code (FCode) in the command table when there is not the information identical to the combined SIP/FCode information in the command table; and
setting the abnormal command level as the maximum risk level when there is not the FCode in the command table based on the determination result.

16. The abnormal traffic detection method of claim 15, wherein the generating of the warning further comprises:
setting the abnormal command level as a medium level between the minimum risk level and the maximum risk level when there is the FCode in the command table.

* * * * *